(12) United States Patent
Hashimoto

(10) Patent No.: US 12,146,760 B2
(45) Date of Patent: Nov. 19, 2024

(54) NAVIGATION CONTROL DEVICE, NAVIGATION METHOD AND NON-TRANSITORY COMPUTER-READABLE RECORDING MEDIUM

(71) Applicant: JVCKENWOOD Corporation, Yokohama (JP)

(72) Inventor: Kazuya Hashimoto, Yokohama (JP)

(73) Assignee: JVCKENWOOD Corporation, Yokohama (JP)

(*) Notice: Subject to any disclaimer, the term of this patent is extended or adjusted under 35 U.S.C. 154(b) by 588 days.

(21) Appl. No.: 17/333,054

(22) Filed: May 28, 2021

(65) Prior Publication Data

US 2021/0285785 A1    Sep. 16, 2021

Related U.S. Application Data

(63) Continuation of application No. PCT/JP2019/023037, filed on Jun. 11, 2019.

(30) Foreign Application Priority Data

Dec. 10, 2018  (JP) ................. 2018-230742

(51) Int. Cl.
*G01C 21/36* (2006.01)
*G06F 18/22* (2023.01)
(Continued)

(52) U.S. Cl.
CPC ....... *G01C 21/3623* (2013.01); *G01C 21/362* (2013.01); *G06F 18/22* (2023.01);
(Continued)

(58) Field of Classification Search
CPC ........ G01C 21/00; G01C 21/26; G01C 21/34; G01C 21/3605; G01C 21/36;
(Continued)

(56) References Cited

U.S. PATENT DOCUMENTS 9,449,228 B1 * 9/2016 Jing ................. G01C 21/30
2017/0146357 A1 * 5/2017 Vertelney ............ G01C 21/367

FOREIGN PATENT DOCUMENTS

JP  2008-180624   8/2008
JP  2012-32339    2/2012
(Continued)

OTHER PUBLICATIONS

International Search Report and Written Opinion for International Application No. PCT/JP2019/023037 mailed on Sep. 17, 2019, 10 pages.

*Primary Examiner* — Khoi H Tran
*Assistant Examiner* — Sarah A Tran
(74) *Attorney, Agent, or Firm* — Amin, Turocy & Watson, LLP

(57) ABSTRACT

A navigation control device includes an image data acquisition unit, a subject specifying unit, a subject position information acquisition unit, and a route guidance unit. The image data acquisition unit is configured to acquire image data. The subject specifying unit is configured to recognize a subject in the image data that is acquired by the image data acquisition unit and specify the subject. The subject position information acquisition unit is configured to acquire position information corresponding to the subject that is specified by the subject specifying unit. The route guidance unit is configured to set, as a destination, the position information corresponding to the subject that is specified by the subject specifying unit and provide route guidance.

8 Claims, 12 Drawing Sheets

(51) Int. Cl.
  *G06T 7/70*          (2017.01)
  *G06V 20/10*         (2022.01)
  *G06V 20/20*         (2022.01)
  *G06V 20/30*         (2022.01)
(52) U.S. Cl.
  CPC ............... *G06T 7/70* (2017.01); *G06V 20/10*
          (2022.01); *G06V 20/20* (2022.01); *G06V*
                                  *20/30* (2022.01)
(58) Field of Classification Search
  CPC ... G01C 21/3623; G01C 21/362; G06F 18/00;
          G06F 18/20; G06F 18/22; G06T 7/00;
          G06T 7/70; G06V 20/00; G06V 20/10;
          G06V 20/20; G06V 20/30; G09B 29/00;
          G09B 29/10; G06K 9/00; G06K 9/62
  USPC ....................................................... 701/410
  See application file for complete search history.

(56) References Cited

FOREIGN PATENT DOCUMENTS

| | | |
|---|---|---|
| JP | 2013-108777 | 6/2013 |
| JP | 2017-96635 | 6/2017 |

\* cited by examiner

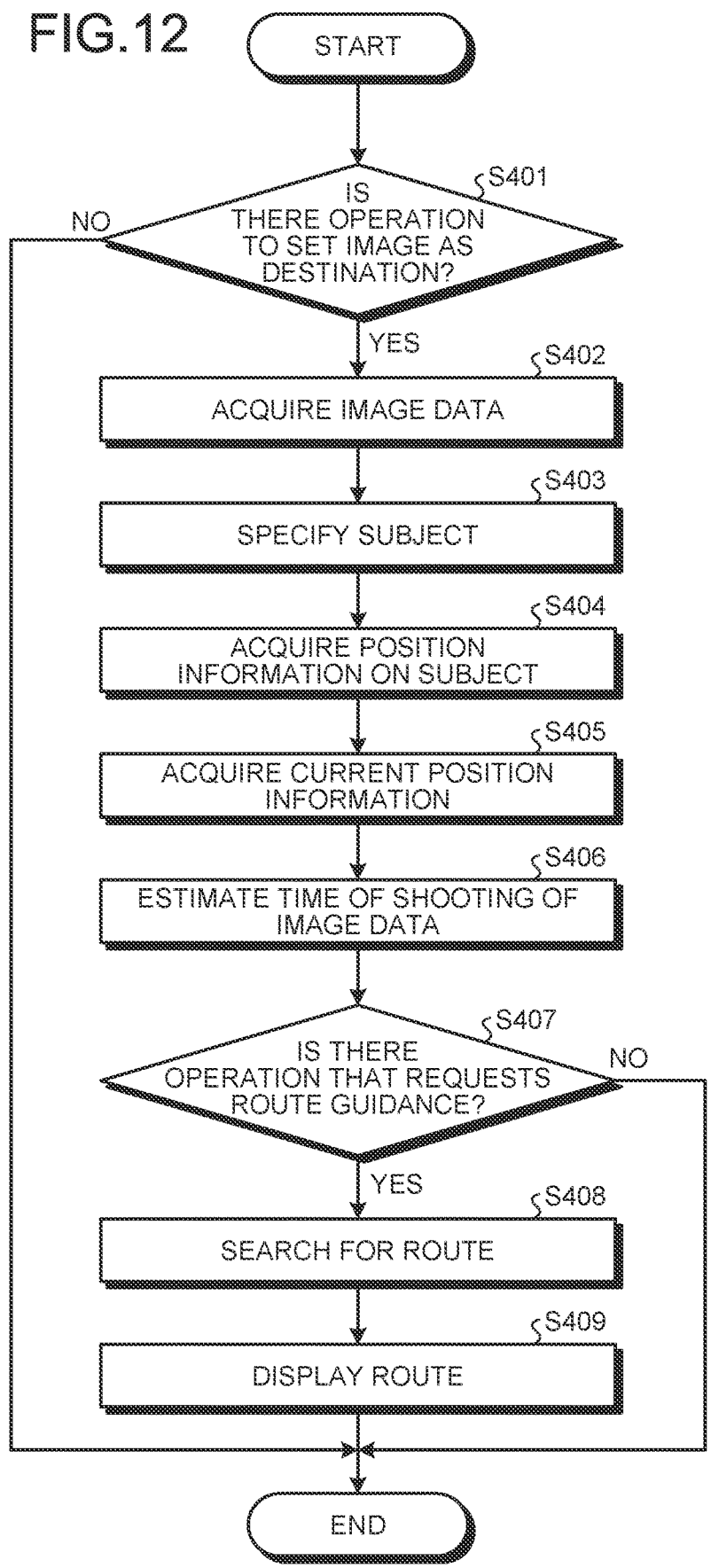

NAVIGATION CONTROL DEVICE, NAVIGATION METHOD AND NON-TRANSITORY COMPUTER-READABLE RECORDING MEDIUM

CROSS-REFERENCE TO RELATED APPLICATIONS

This application is a Continuation of PCT International Application No. PCT/JP2019/023037 filed on Jun. 11, 2019 which claims the benefit of priority from Japanese Patent Application No. 2018-230742 filed on Dec. 10, 2018, the entire contents of which are incorporated herein by reference.

BACKGROUND

The disclosure relates to a navigation control device, a navigation method, and a non-transitory computer-readable recording medium.

A technique has been known in which the site of a public facility, a tourist attraction, a place of interest, a historic site, an accommodation, a restaurant, or a gas station is represented by a symbol, such as a barcode, as position information on information magazines and information terminal device screens, and reading the symbol enables route guidance to the destination (for example, refer to JP 2013-108777 A).

When a user sees an image available on the Internet or an image on a printed matter, such as a magazine or a pamphlet, the image may spur the user to want to go to the site. According to the technique disclosed in JP 2013-108777 A, when a symbol representing position information is not added to an image, the user has to search for the name or position of the subject represented by the image. There is a demand that route guidance be provided easily from an image available on the Internet, an image on a printed matter, or an image obtained by the user by shooting.

SUMMARY

A navigation control device includes an image data acquisition unit, a subject specifying unit, a subject position information acquisition unit, and a route guidance unit. The image data acquisition unit is configured to acquire image data. The subject specifying unit is configured to recognize a subject in the image data that is acquired by the image data acquisition unit and specify the subject. The subject position information acquisition unit is configured to acquire position information corresponding to the subject that is specified by the subject specifying unit. The route guidance unit is configured to set, as a destination, the position information corresponding to the subject that is specified by the subject specifying unit and provide route guidance.

BRIEF DESCRIPTION OF THE DRAWINGS

FIG. 12 is a flowchart representing a flow of a process performed by a navigation control device according to the fifth embodiment.

DETAILED DESCRIPTION

With reference to the accompanying drawings, embodiments of a navigation control device, a navigation method, and a program according to the disclosure will be described in detail. The present invention is not limited to the embodiments.

First Embodiment

Figure 1:
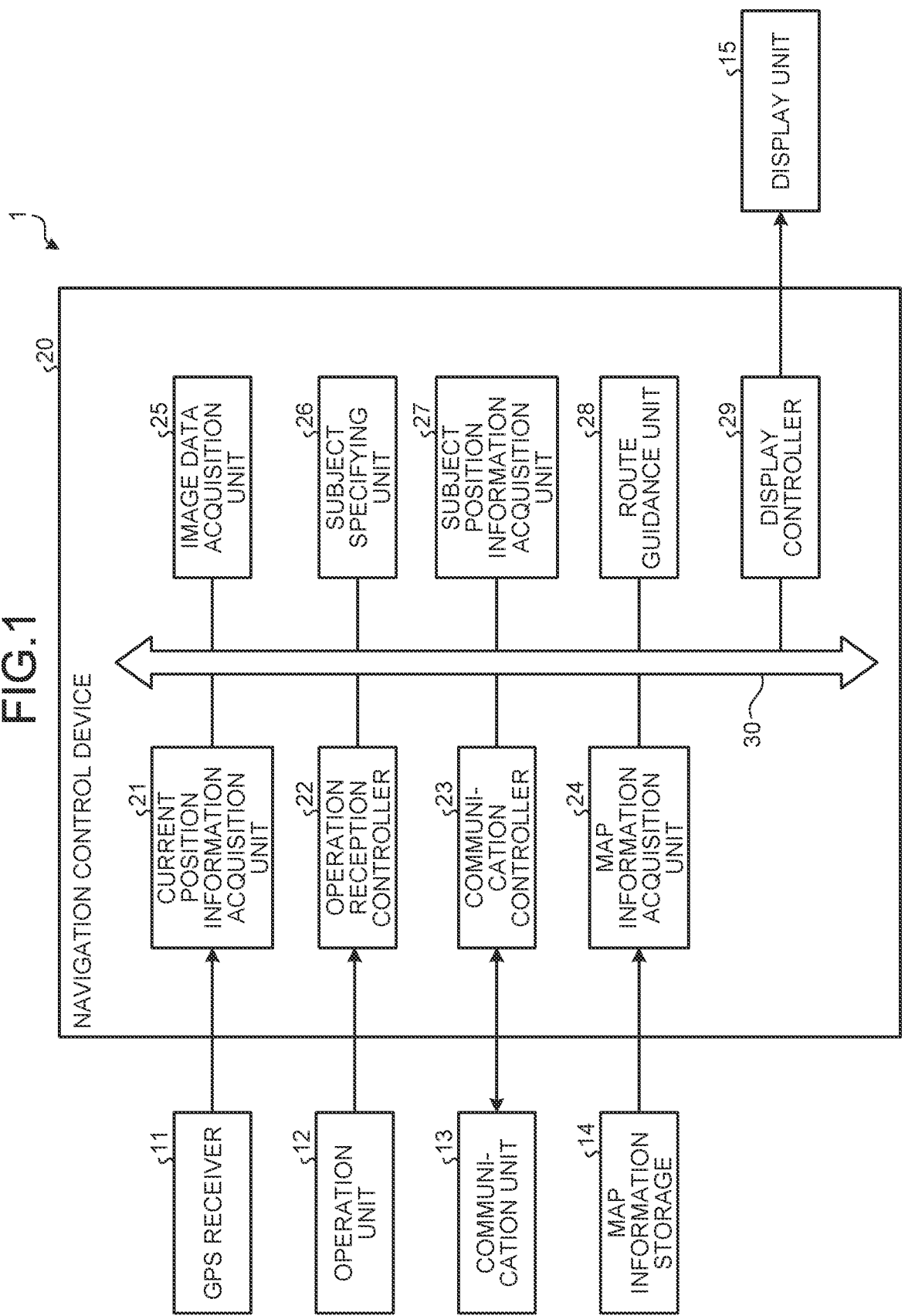
FIG. 1 is a block diagram illustrating an outline of a navigation control device according to a first embodiment.

FIG. 1 is a block diagram schematically illustrating an outline of a navigation control device according to a first embodiment. A navigation system 1 recognizes and specifies a subject in an image through image processing and provides route guidance in which position information corresponding to the subject is set as a destination. The navigation system 1 may be installed in a vehicle or may be portable and taken into a vehicle. The navigation system 1 includes a global positioning system (GPS) receiver 11, an operation unit 12, a communication unit 13, a map information storage 14, a display unit 15, and a navigation control device 20.

The navigation system 1 may be formed of a portable terminal device, a device that is set in a vehicle, or a combination of some devices.

The subject includes, for example, places of scenic beauty, places of interest, structures, streetscapes, natural scenery, the inside of structures, such as the distinctive interior of a shop, distinctive products, distinctive food or drink, distinctive living things, and distinctive plants. A distinctive subject refers to a subject that is identifiable and distinguishable from others.

The GPS receiver 11 receives radio waves from a GPS satellite (not illustrated in the drawing). The GPS receiver 11 outputs a signal of the received radio waves to a current position information acquisition unit 21 of the navigation control device 20.

The operation unit 12 is capable of receiving various operations on the navigation control device 20. The operation unit 12 is formed of, for example, a physical operation unit for the navigation control device 20 or a touch panel that is arranged on the display unit 15. For example, the operation unit 12 is capable of receiving an operation of inputting a destination. For example, the operation unit 12 is capable of receiving an operation of starting route guidance from the current position to a destination. The operation unit 12 outputs operation information to an operation reception controller 22 of the navigation control device 20.

The communication unit 13 is a communication unit. The communication unit 13 may perform communication using any method, such as the Internet or a mobile-phone line.

The map information storage 14 stores map information. The map information is, for example, a road map containing intersections. The map information storage 14 outputs the stored map information to a map information acquisition unit 24 of the navigation control device 20. The map information storage 14 may be a storage device, such as an external server, that acquires the map information via a communication function, such as a communication controller 23 and the communication unit 13.

The display unit 15 is, for example, a display device only for the navigation system 1 or a display device that is shared with other systems including a car audio equipment. The display unit 15 is, for example, a display including a liquid crystal display (LCD) or an organic electro-luminescence (EL) display. In the first embodiment, the display unit 15 is a touch panel display. In other words, the display unit 15 functions as the operation unit 12, and various operations can be input to the display unit 15. When the navigation system 1 is set in a vehicle, the display unit 15 is arranged in a dashboard, an instrument panel, or a center console ahead the driver of the vehicle, or the like. The display unit 15 displays a route guidance video based on a video signal that is output from a display controller 29 of the navigation control device 20.

In the first embodiment, the display unit 15 displays a web browser. When the user wants to go to a site corresponding to an image that is displayed on the web browser, the user performs a touch operation on the image. When a touch operation on the image is performed, the image on which the touch operation is performed is output to an image data acquisition unit 25.

The navigation control device 20 may be implemented as a function of a navigation system for vehicles. In the embodiment, the navigation control device 20 is installed as a function of the navigation system that is installed in a vehicle. The navigation control device 20 is, for example, a processing unit formed of, for example, a central processing unit (CPU), etc. The navigation control device 20 executes commands contained in a program that is stored in a storage (not illustrated in the drawing). The navigation control device 20 recognizes and specifies the subject in the image data and performs route guidance in which position information corresponding to the subject is set as a destination. The navigation control device 20 includes the current position information acquisition unit 21, the operation reception controller 22, the communication controller 23, the map information acquisition unit 24, the image data acquisition unit 25, a subject specifying unit 26, a subject position information acquisition unit 27, a route guidance unit 28, and the display controller 29.

The current position information acquisition unit 21 acquires current position information representing the current position of the vehicle. In the first embodiment, the current position information acquisition unit 21 acquires the current position information on the vehicle based on a signal of radio waves that are acquired by the GPS receiver 11. The current position information acquisition unit 21 outputs the acquired current position information to the route guidance unit 28.

The operation reception controller 22 acquires operation information on an operation that is received by the operation unit 12. For example, the operation reception controller 22 acquires destination input operation information representing an operation of inputting a destination and outputs a control signal. For example, the operation reception controller 22 acquires guidance start operation information representing an operation of starting route guidance and outputs a control signal.

The communication controller 23 controls communication in the communication unit 13.

The map information acquisition unit 24 acquires map information from the map information storage 14. More specifically, based on the position information on the current position of the vehicle that is acquired by the current position information acquisition unit 21 and position information on the destination, the map information acquisition unit 24 acquires map information on the map from the current position of the vehicle to the destination from the map information storage 14.

The image data acquisition unit 25 acquires image data that spurs the user to want to go to the site. In the first embodiment, the image data acquisition unit 25 acquires the image data displayed on the display unit 15.

Figure 2:
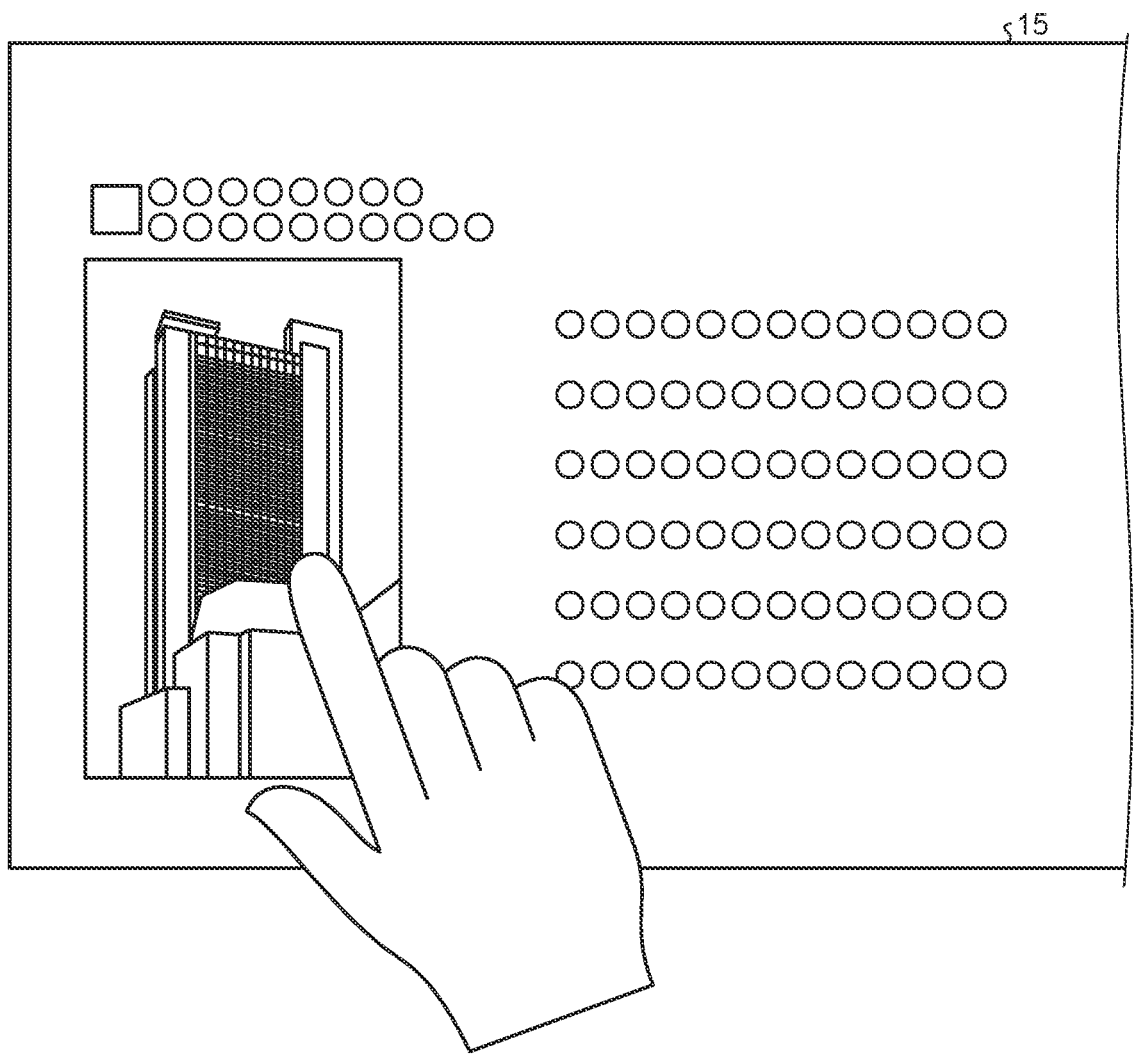
FIG. 2 is a diagram illustrating that a user is performing a touch operation on an image on a web browser.

Using FIG. 2, a process of acquiring image data that is performed by the image data acquisition unit 25 will be described more in detail. FIG. 2 is a diagram illustrating that a user is performing the touching operation on an image on a web browser. When the user performs a touch operation on the image displayed on the web browser, the image data acquisition unit 25 makes, on the display unit 15, popup displays of, for example, a message image saying "Will you set the photo as the destination?" and button images to choose "YES" or "NO" or outputs audio guidance from the speaker. When a control signal indicating that the user performs a touch operation of choosing the "YES" button image is output via the operation reception controller 22, the image data acquisition unit 25 acquires the image data on which the touch operation is performed. When a control signal indicating that the user performs a touch operation of choosing the "NO" button image is output via the operation reception controller 22, the image data acquisition unit 25 ends the process.

A method of acquiring image data employed by the image data acquisition unit 25 is not limited to the above-described method and various methods are applicable. For example, the navigation control device 20 may acquire an image that is specified on a web browser of another terminal device or an image that is saved in another terminal device via a communication line, or the like.

The subject specifying unit 26 recognizes the subject in the image data acquired by the image data acquisition unit 25 and specifies the subject. More specifically, the subject specifying unit 26 performs image processing on the image data and performs pattern matching with a recognition dictionary that is stored previously, thereby recognizing the subject in the image data. The subject specifying unit 26 may acquire information, such as the name of the specified subject, by transmitting the image data to an external server (not illustrated in the drawing) that performs a process of specifying the subject from the image data via the communication unit 13 under the control of the communication controller 23. The subject specifying unit 26 or the external server that specifies the subject performs machine learning using a lot of photos, such as photos on the Web, and uniquely specifies a subject with high similarity to the subject in the image data. For the method of specifying a subject, a known method is available and is not limited.

Uniquely specifying a subject means acquiring information from which position information can be acquired from the map information storage 14. Uniquely specifying a subject means, for example, specifying the subject by a unique name, a phone number or an address. For example, in the case of the image data illustrated in FIG. 2, the subject is specified by a unique name "A tower".

The subject specifying unit 26 may specify a shot subject at the center of the image as the subject. The subject specifying unit 26 may specify a shot subject occupying the largest area in the image as the subject. The subject specifying unit 26 may specify a shot subject at the most front in the image as the subject. The subject specifying unit 26 may specify a shot subject that is clear in the image as the subject. The subject specifying unit 26 may specify, as the subject, a well-known shot subject, such as a place of scenic beauty, a place of interest, a structure, a streetscape, natural scenery, the inside of a structure like the interior of a shop, a product, food or drink, a living thing, or a plant. Being well known means being repeatedly on printed matters, such as mass-circulation books, or on well-visited web sites.

The subject specifying unit 26 may specify, as the subject, a shot subject containing a part that is touched when the user performs the touch operation on the image. With this, for example, when multiple structures, products, etc., are in the image data, it is possible to appropriately specify a shot subject that the user wants to set for a destination.

The subject position information acquisition unit 27 acquires position information corresponding to the subject that is specified by the subject specifying unit 26. More specifically, the subject position information acquisition unit 27 acquires position information corresponding to the specified subject from the map information storage 14 via the map information acquisition unit 24. For example, when the specified subject is a place of scenic beauty, a place of interest, a structure, a streetscape or natural scenery, the subject position information acquisition unit 27 acquires position information on the location of the subject. For example, when the specified subject is the inside of a structure, such as the interior of a shop, the subject position information acquisition unit 27 acquires position information on the location of the structure. For example, when the specified subject is a product or food or drink, the subject position information acquisition unit 27 acquires position information on the location of a shop sells the subject. When multiple sets of position information on the locations of shops selling the subject are acquired, position information on the shop that is the closest to the current position is acquired. For example, when the specified subject is a living thing or plant, the subject position information acquisition unit 27 acquires position information on the location of a zoo, an aquarium or a botanical garden where the user can see living things or plants.

The route guidance unit 28 sets, as a destination, position information corresponding to the subject that is specified by the subject position information acquisition unit 27 and provides route guidance. More specifically, the route guidance unit 28 searches for a route based on the current position of the vehicle and the position information on the destination. For the method of searching for a route, a known route search method is available and is not limited. The route guidance unit 28 provides route guidance along the route searched for. For the method for route guidance, a known route guidance method is available and is not limited.

The display controller 29 displays, on the display unit 15, a video of the route guidance along the route that is searched for by the route guidance unit 28.

Figure 3:
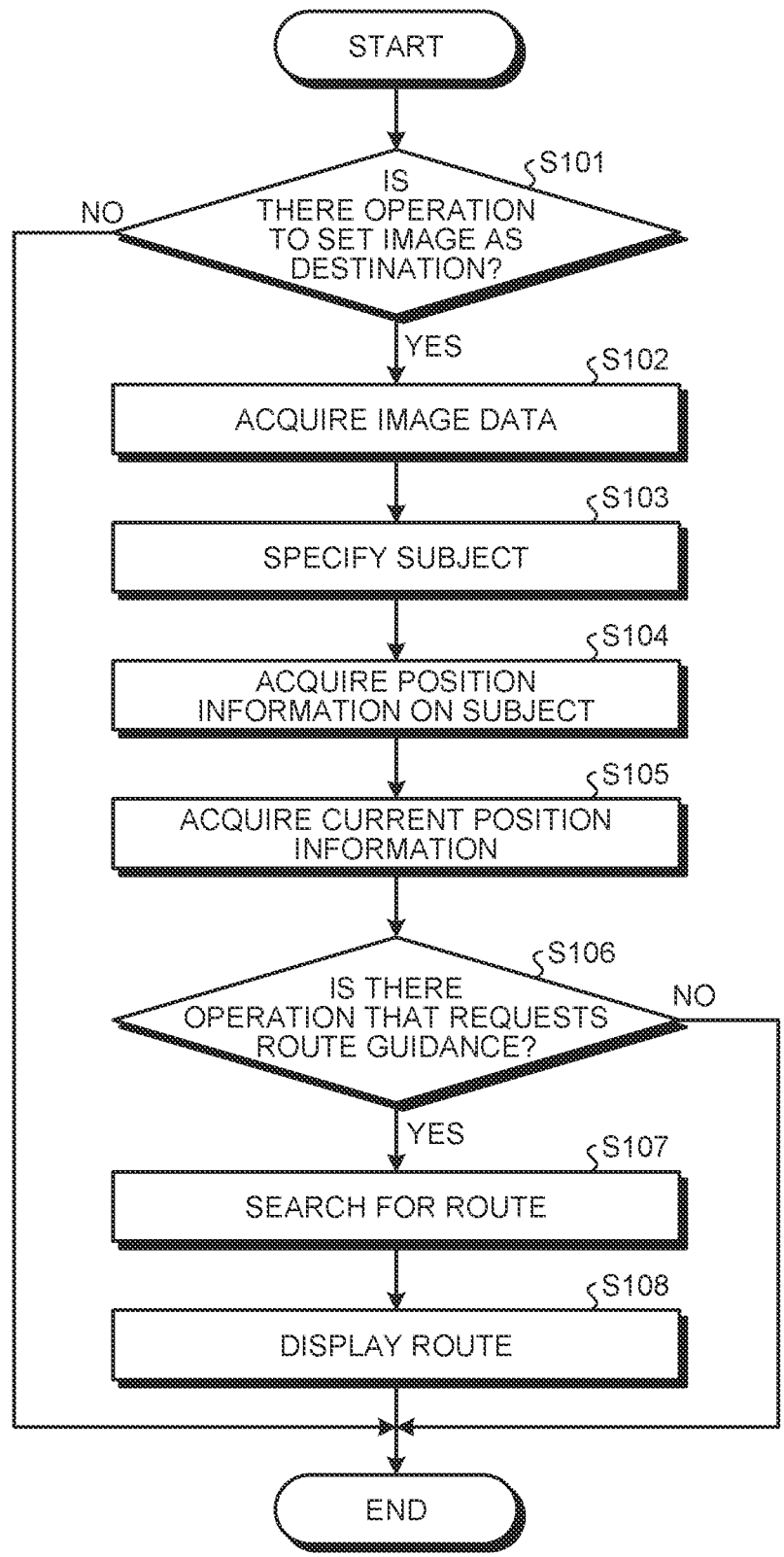
FIG. 3 is a flowchart representing a flow of a process performed by the navigation control device according to the first embodiment.

Using FIG. 3, information processing performed by the navigation system 1 will be described. FIG. 3 is a flowchart representing the flow of the process performed by the navigation control device according to the first embodiment.

The user, for example, see information on a place of interest on the display unit 15 of the navigation system 1 via a web browser. When the user wants to go to the site of the image displayed on the web browser, the user performs a touch operation on the image as illustrated in FIG. 2. Via the web browser, pop-up displays of, for example, a message image saying "Will you set the photo as the destination?" and button images to choose "YES" or "NO" are made on the display unit 15 or audio guidance is output from a speaker. In setting the image as a destination, the user performs a touch operation on the "YES" button image. In not setting the image as a destination, the user performs a touch operation on the "NO" button image.

The navigation control device 20 determines whether an operation of setting the image as a destination is performed (step S101). More specifically, when the operation reception controller 22 acquires operation information indicating that the touch operation is performed on the "YES" button, the navigation control device 20 determines that an operation of setting the image as a destination is performed (YES at step S101) and goes to step S102. When the operation reception controller 22 does not acquire the operation information indicating that the touch operation is performed on the "YES" button, the navigation control device 20 determines that the operation of setting the image as a destination is not performed (NO at step S101) and ends the process.

When the operation of setting the image as a destination is performed (YES at step S101), the navigation control device 20 acquires image data (step S102). More specifically, using the image data acquisition unit 25, the navigation control device 20 acquires the image data on which the user performs the touch operation. The navigation control device 20 goes to step S103.

The navigation control device 20 specifies a subject from the image data that is acquired at step S102 (step S103). More specifically, using the subject specifying unit 26, the navigation control device 20 performs image processing on the image data, performs pattern matching with a recognition dictionary, and then recognizes and specifies the subject in the image data. In the example in FIG. 2, when the user chooses a photo representing "A Tower", the subject specifying unit 26 specifies the subject as "A Tower". The navigation control device 20 then goes to step S104.

The navigation control device 20 acquires position information on the subject that is specified at step S103 (step S104). More specifically, using the subject position information acquisition unit 27, the navigation control device 20 acquires position information corresponding to the specified subject from the map information storage 14 via the map information acquisition unit 24. In the example in FIG. 2, position information on "A Tower" that is the subject is acquired. The navigation control device 20 then goes to step S105.

The navigation control device 20 acquires current position information (step S105). The navigation control device 20 constantly acquires and updates the current position information. At step S105, the navigation control device 20 acquires current position information serving as a start point of route guidance to the position information on the subject that is acquired at step S104. When the navigation control device 20 is set in a vehicle, the current position information acquisition unit 21 acquires the current position information on the vehicle. The navigation control device 20 then goes to step S106.

The navigation control device 20 then determines whether there is an operation that requests route guidance (step S106). More specifically, using the route guidance unit 28, the navigation control device 20 shows the user the name of the specified subject, the location, and the distance from the current position based on the position information on the subject that is acquired by the subject position information acquisition unit 27 and the current position information on the vehicle. Using the route guidance unit 28, the navigation control device 20 asks the user whether to provide route guidance. When the user executes an operation that requests route guidance (YES at step S106), the navigation control device 20 goes to step S107. When the user does not execute the operation that requests route guidance (NO at step S106), the navigation control device 20 ends the process.

At step S106, using the route guidance unit 28, the navigation control device 20 makes pop-up displays of a message image saying "The photo shows A Tower locating in C City in B Prefecture. The distance from here is 23 km. Will you set A Tower as the destination?" and button images for choosing "YES" or "NO" or outputs audio guidance. When the user performs a touch operation of choosing the "YES" button image (YES at step S106), the navigation control device goes to step S107 and starts a route guidance process using the route guidance unit 28. When the user performs the touch operation of choosing the "NO" button image (NO at step S106), the route guidance unit 28 ends the process without performing the route guidance process.

When the user performs an operation that requests route guidance (YES at step S106), the navigation control device 20 searches for a route (step S107). More specifically, using the route guidance unit 28, the navigation control device 20 searches for a route based on the current position information on the vehicle and the position information on the destination. The navigation control device 20 goes to step S108.

The navigation control device 20 displays the route (step S108). More specifically, using the display controller 29, the navigation control device 20 displays a guidance image of the searched—for route on the display unit 15. The navigation control device 20 then ends the process.

As described above, when the user chooses an image that is displayed on the web browser, the navigation system 1 recognizes and specifies a subject contained in the image by performing image processing and provides route guidance from the current position to the subject.

As described above, according to the first embodiment, when a user performs a touch operation on an image displayed on a web browser, it is possible to recognize and specify a subject contained in the image by performing image processing and provide route guidance from the current position to the subject. According to the embodiment, when a user sees an image and the image spurs the user to want to go to the site, the user is not required to specify a subject in the image and search for the position or name of the subject. As described above, in the first embodiment, it is possible to provide route guidance easily from an image available on the Internet.

Second Embodiment

Figure 4:
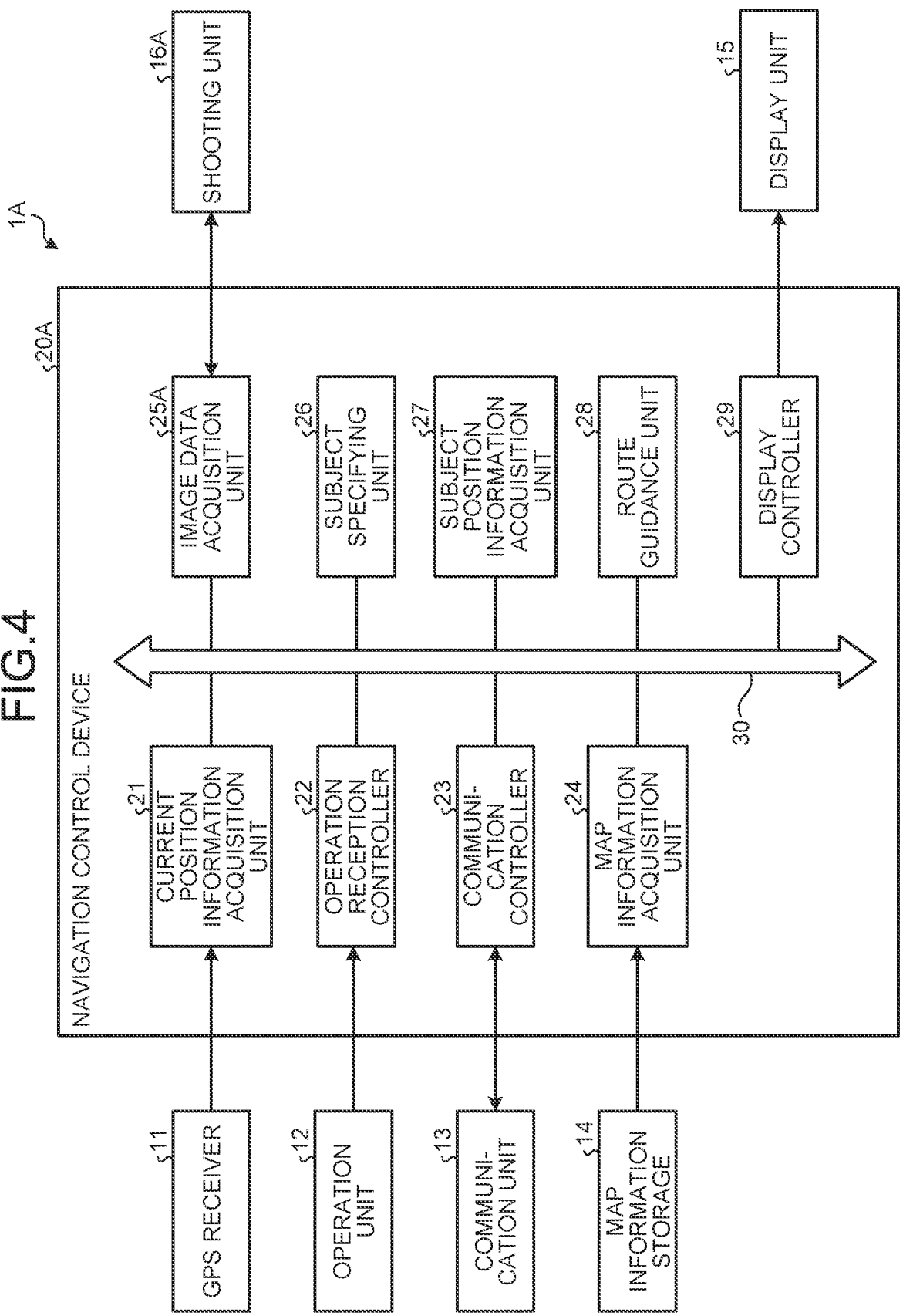
FIG. 4 is a block diagram illustrating an outline of a navigation control device according to a second embodiment.
Figure 5:
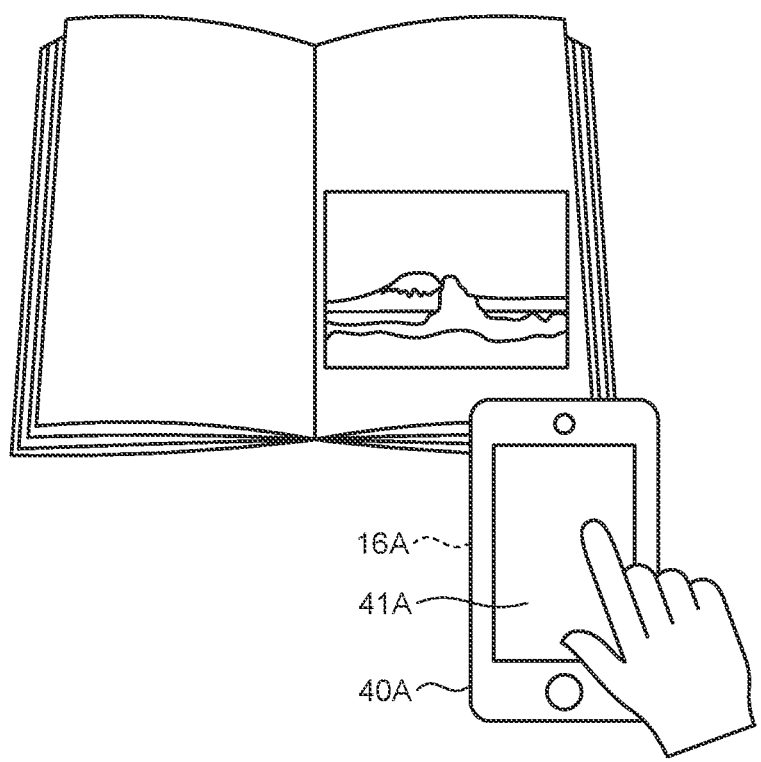
FIG. 5 is a diagram illustrating that the user is shooting a photo on a magazine using a shooting unit.

With reference to FIGS. 4 and 5, a navigation system 1A according to a second embodiment will be described. FIG. 4 is a block diagram illustrating an outline of a navigation control device according to the second embodiment. FIG. 5 is a diagram illustrating that the user is shooting a photo on a magazine using a shooting unit. A basic configuration of the navigation system 1A according to the second embodiment is the same as that of the navigation system 1 of the first embodiment. In the following description, the same components as those of the navigation system 1 are denoted with the same reference numbers or corresponding reference numbers and detailed description thereof will be omitted. The navigation system 1A of the embodiment is different from the navigation system 1 of the first embodiment in including a shooting unit 16A and in a navigation control device 20A.

The shooting unit 16A is a camera capable of shooting an image on a printed matter, such as a magazine. The shooting unit 16A may be an electronic device that is connected with the navigation control device 20A with near field communication. In the second embodiment, the shooting unit 16A is a camera that is integrally provided in a portable electronic device 40A that functions as the navigation system 1A. The shooting unit 16A is capable of outputting the image data obtained by shooting to an image data acquisition unit 25A.

Using FIG. 5, the case where an image is shot using the shooting unit 16A will be described. The image shot by the shooting unit 16A is displayed on a display unit 41A of the portable electronic device 40A. Furthermore, for example, popup displays of a message image saying "Will you set the photo as the destination?" and button images to choose "YES" or "NO" are displayed are made on the display unit 41A or audio guidance is output from a speaker. When a control signal indicating that the user performs a touch operation of choosing the "YES" button image is output, the portable electronic device 40A outputs the image data on which the touch operation is performed to the image data acquisition unit 25A.

The image data acquisition unit 25A acquires image data obtained by shooting by the shooting unit 16A.

As described above, when the user shoots an image on a printed matter, the portable electronic device 40A functioning as the navigation system 1 recognizes and specifies a subject contained in the image by performing image processing and provides route guidance from the current position to the subject.

As described above, according to the second embodiment, when a user shoots an image on a printed matter, it is possible to recognize and specify a subject contained in the image by performing image processing and provide route guidance from the current position to the subject. As described above, in the embodiment, it is possible to easily provide route guidance from an image on a printed matter.

Third Embodiment

Figure 6:
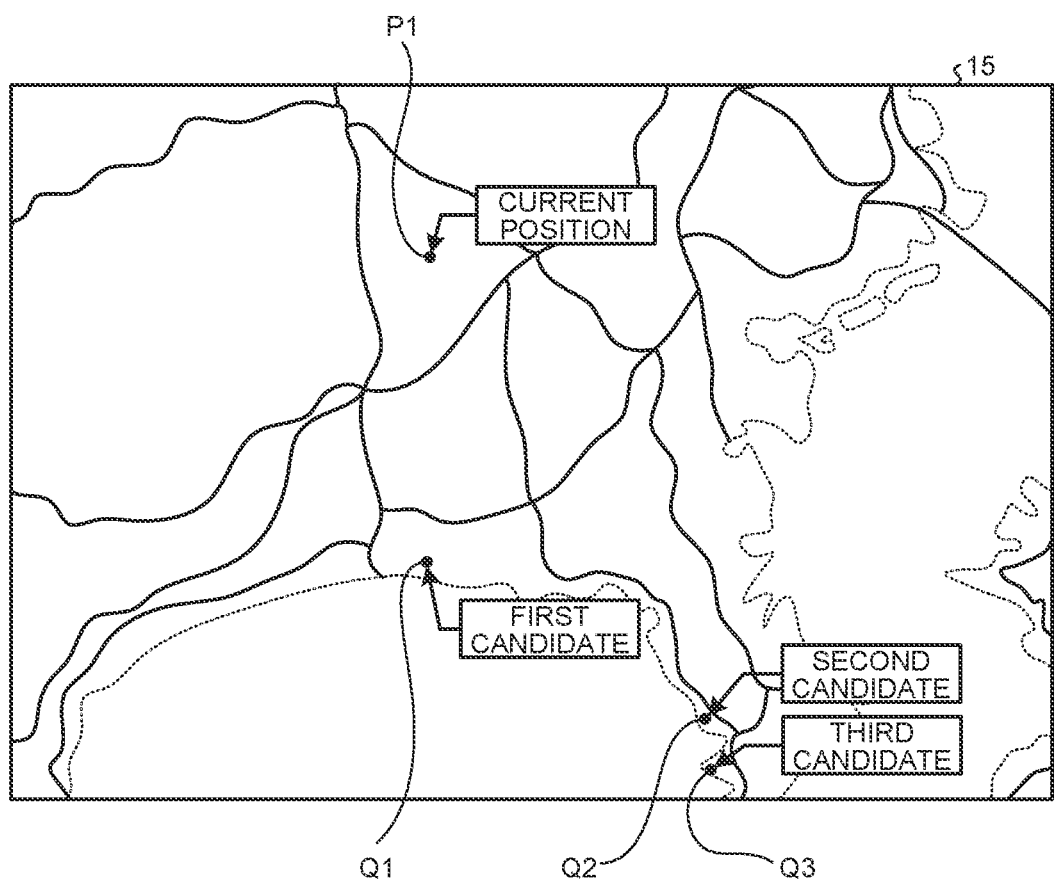
FIG. 6 is a diagram illustrating a display unit on which multiple candidate subjects are displayed.
Figure 7:
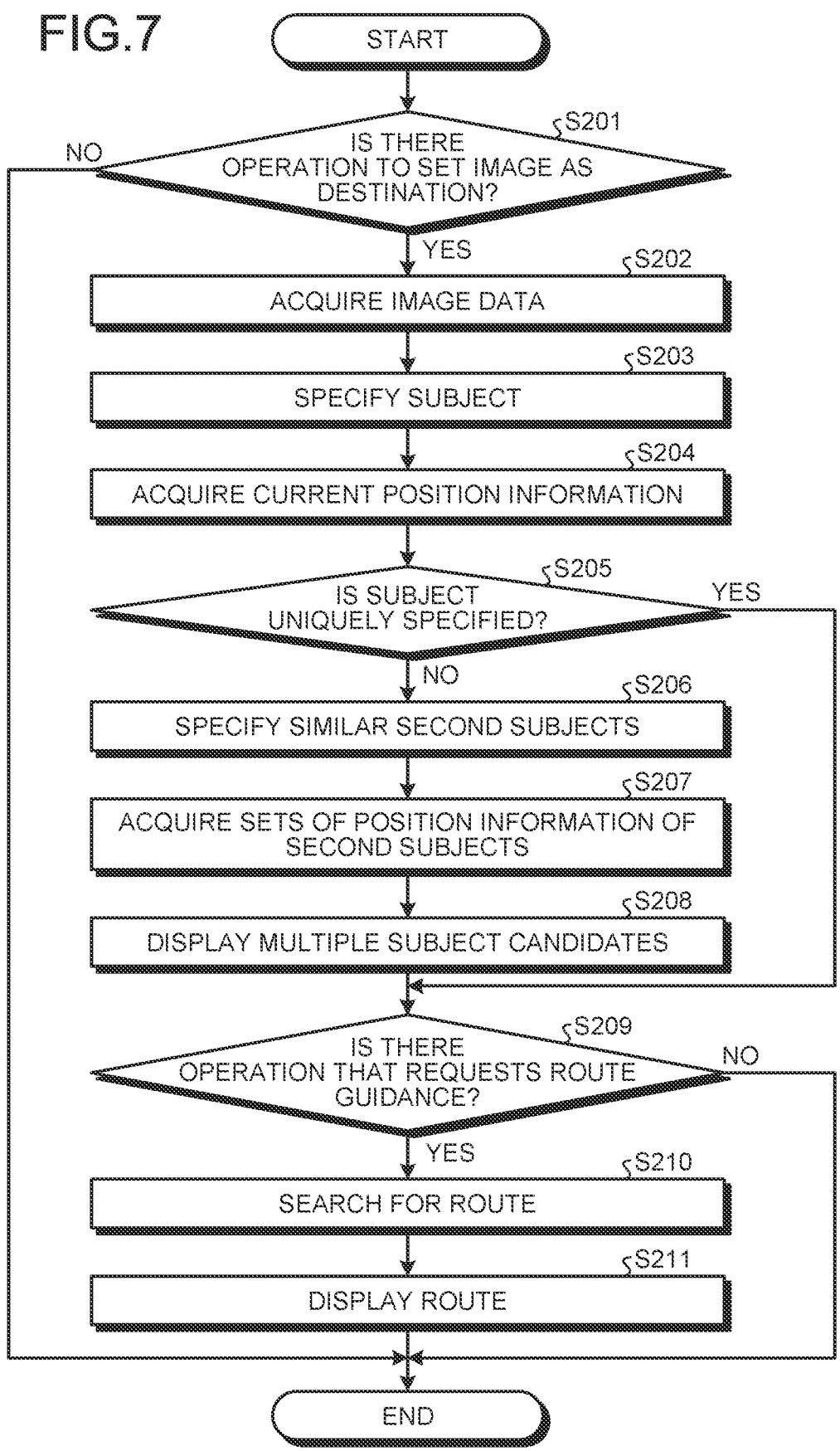
FIG. 7 is a flowchart representing a flow of a process performed by a navigation control device according to a third embodiment.

With reference to FIGS. 6 and 7, the navigation system 1 according to a third embodiment will be described. FIG. 6 is a diagram illustrating a display unit on which multiple candidate subjects are displayed. FIG. 7 is a flowchart representing a flow of a process performed by a navigation control device according to the third embodiment. The navigation system 1 according to the third embodiment is different from the navigation system 1 of the first embodiment in the processes performed by the subject specifying unit 26, the subject position information acquisition unit 27, and the route guidance unit 28.

When being unable to uniquely specify a recognized subject, the subject specifying unit 26 specifies a similar subject.

Being unable to uniquely specify refers to the case where an index representing a degree of matching in pattern matching with a recognition dictionary is under a given value. For example, the index representing the degree of matching is "100" when all feature values match. For example, when the index representing the degree of matching is under "80", it is determined that the recognized subject cannot be uniquely specified.

When being unable to uniquely specify a recognized subject, the subject specifying unit 26 specifies, as a second subject, a subject with more matching features and whose index representing a degree of matching is high. For example, when the subject is a structure, the subject specifying unit 26 specifies, as a second subject, a subject that matches in many features on how many floors the structure has, what shape the structure has, and what color the exterior wall is and has a high index representing a degree of matching. For example, when the subject is natural scenery, the subject specifying unit 26 specifies, as a second subject, a subject that matches in many features on in what scenery, in what shape, and in what color the natural scenery is and has a high index representing a degree of matching. In the embodiment, when the recognized subject cannot be uniquely specified, multiple subjects each with a high degree of matching are specified. Multiple subjects each with a high degree of matching include, in addition to a subject with a high degree of matching, a similar second subject.

Using FIG. 5, a process of specifying a subject that is performed by the subject specifying unit 26 will be described more in detail. The subject specifying unit 26 specifies that the image data illustrated in FIG. 5 is most likely to be "E Rock at D Coast". When the index representing a degree at which the recognized subject matches "E Rock at D Coast" contained in the recognition dictionary is lower than "80", the subject specifying unit 26 specifies another similar reef as a second subject in addition to "E Rock at D Coast". For example, the subject specifying unit 26 specifies a reef that is similar to "E Rock at D Coast" and whose degree of matching is at or above "60" as a second subject.

The subject position information acquisition unit 27 acquires pieces of position information respectively corresponding to the multiple subjects that are specified by the subject specifying unit 26.

The route guidance unit 28 sets, as a destination, the position information corresponding to a subject that is chosen by the user from among the subjects that are acquired by the subject position information acquisition unit 27 and provides route guidance. More specifically, the route guidance unit 28 displays an image obtained by superimposing the pieces of position information on the subjects, which are acquired by the subject position information acquisition unit 27, onto a map. The route guidance unit 28 prompts the user to choose a subject to be set as a destination on the map. The route guidance unit 28 sets the position information corresponding to the subject that is chosen by the user as a destination and provides route guidance.

Using FIG. 6, the case where multiple subjects are displayed by the route guidance unit 28 will be described. In the third embodiment, together with a current position P1, a first candidate 01, a second candidate 02, and a third candidate Q3 that are multiple subjects are displayed. The first candidate Q1 is "E Rock at D coast" and the second candidate 02 and the third candidate Q are reefs serving as second subjects that are similar in shape to the first candidate Q1. The route guidance unit 28 displays for example, a message image saying "This photo is highly likely to be of the sea in G City in F Prefecture and there is another similar candidate." on the display unit 15 or outputs audio guidance from the speaker. The user performs a touch operation on a subject that the user wants to set as a destination and accordingly the chosen subject is set as the destination.

The route guidance unit 28 may choose a subject that is the closest to the current position from among the subjects acquired by the subject position information acquisition unit 27 and set position information corresponding to the chosen subject as a destination and provide route guidance.

Using FIG. 7, information processing performed by the navigation system 1 will be described. For the process of steps S201 to S203, step S204, and step S211 in the flowchart represented in FIG. 7, the same process as that of steps S101 to S103, step S105 and step S108 in the flowchart represented in FIG. 3 is performed.

Around the same time as acquisition of the position information on the subject at step S204, the navigation control device 20 determines whether the subject is uniquely specified (step S205). When it is determined that the subject specifying unit 26 uniquely specifies the subject (YES at step S205), the navigation control device 20 goes to step S209. When it is determined that the subject specifying unit 26 does not uniquely specify the subject (NO at step S205), the navigation control device 20 goes to step S206.

When it is determined that the subject specifying unit 26 does not uniquely specify the subject (NO at step S205), the navigation control device 20 specifies a similar second subject using the subject specifying unit 26 (step S206). More specifically, when the subject specifying unit 26 does not uniquely specify the recognized subject, the navigation control device 20 specifies subjects each with a high degree of matching. The navigation control device 20 goes to step S207.

Using the subject position information acquisition unit 27, the navigation control device 20 acquires pieces of position information respectively corresponding to the second subjects specified by the subject specifying unit 26 (step S207). The navigation control device 20 goes to step S208.

The navigation control device 20 displays the subjects (step S208). More specifically, using the route guidance unit 28, the navigation control device 20 displays an image obtained by superimposing the subjects acquired by the subject position information acquisition unit 27 at step S204 and step S207 on a map. The navigation control device 20 then goes to step S209.

The navigation control device 20 determines whether an operation that requests route guidance is performed (step S209). More specifically, when the user chooses a subject to be set as a destination on the map on which the subjects are displayed, the navigation control device 20 determines that the operation that requests route guidance is performed (Yes at step S209) and goes to step S210. When the user does not choose any subject to be set as a destination on the map, the navigation control device 20 determines that the operation that requests route guidance is not performed (NO at step S209) and ends the process.

When the operation that requests route guidance is performed (YES at step S209), using the route guidance unit 28, the navigation control device 20 sets, as a destination, position information corresponding to the subject that chosen by the user and searches for a route (step S210).

As described above, when being unable to uniquely specify the recognized subject, the navigation system 1 specifies similar subjects.

As described above, in the third embodiment, when it is not possible to uniquely specify a recognized subject, specifying similar subjects and prompting the user to choose a subject to be set as a destination easily enables route guidance.

Fourth Embodiment

Figure 8:
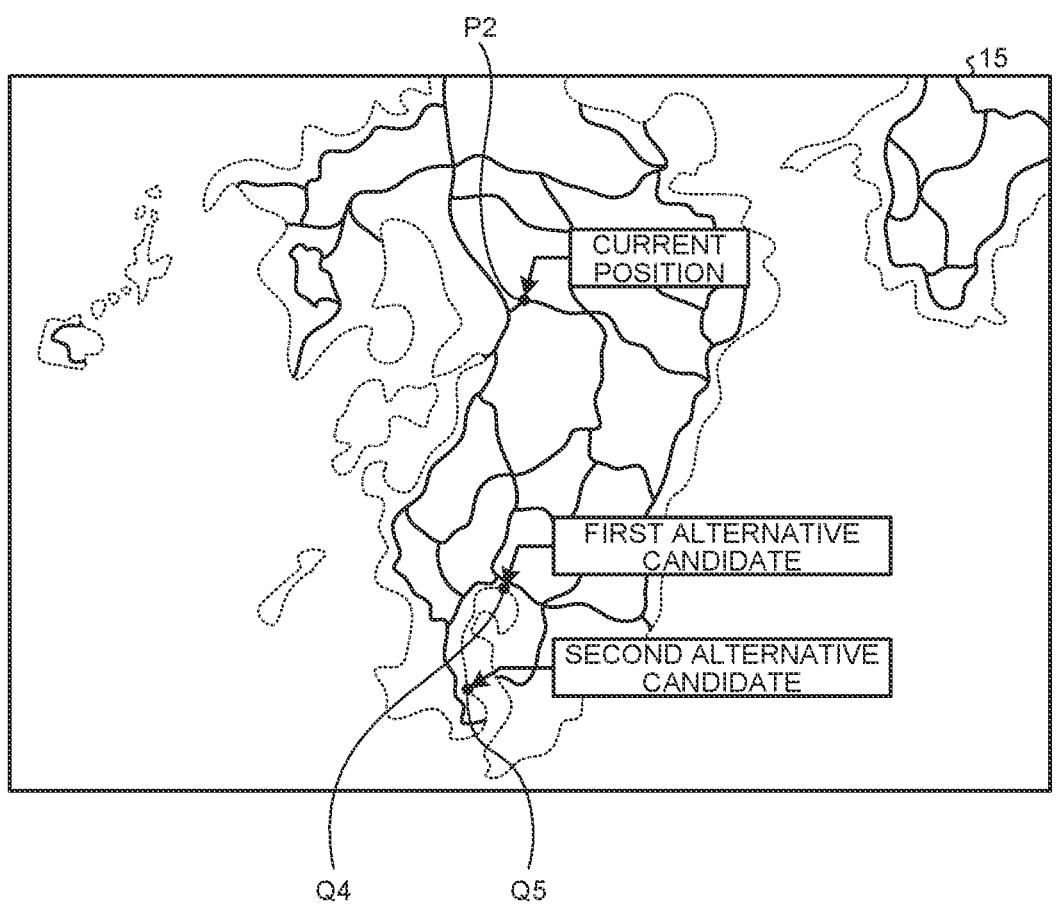
FIG. 8 is a diagram illustrating a display unit on which multiple candidate subjects are displayed.
Figure 9:
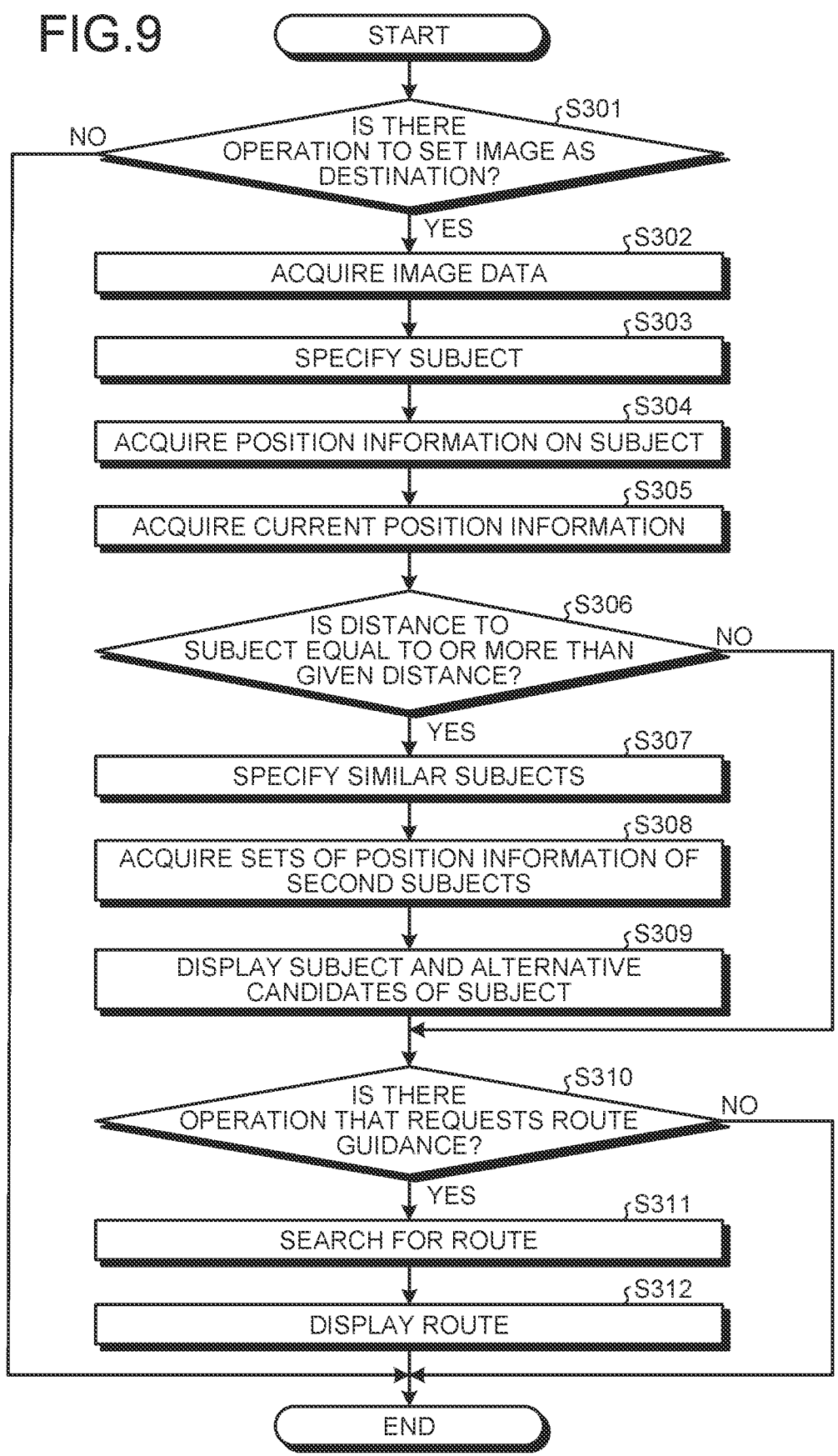
FIG. 9 is a flowchart representing a flow of a process performed by a navigation control device according to a fourth embodiment.

With reference to FIGS. 8 and 9, the navigation system 1 according to a fourth embodiment will be described. FIG. 8 is a diagram illustrating a display unit on which multiple candidate subjects are displayed. FIG. 9 is a flowchart representing a flow of a process performed by a navigation control device according to the fourth embodiment. The navigation system 1 according to the fourth embodiment is different from the navigation system 1 of the first embodiment in the process performed by the subject specifying unit 26.

When a distance from the current position to a recognized subject is equal to or more than a given distance, the subject specifying unit 26 specifies a similar subject. In the fourth embodiment, the subject specifying unit 26 uniquely specifies that the recognized subject is "E Rock at D Coast". The distance from Kumamoto Prefecture in which the current position locates to "E Rock at D Coast" that is the subject is however equal to or more than the given distance. Thus, a reef that is similar to "E Rock at D Coast" and is within the given distance from the current position is specified as an alternative candidate of the subject.

The given distance may be, for example, 100 km. The given distance may be, for example, a distance on which an expected time to get to the destination from the current position is 4 hours or less. The given distance may be, for example, a distance allowing a single-day trip.

Using FIG. 8, the case where the route guidance unit 28 displays a second subject serving as an alternative subject will be described. In the fourth embodiment, a current position P2, a first alternative candidate Q4, and a second alternative candidate Q5 are displayed. The route guidance unit 28, for example, displays a message image saying "The picture is highly likely to be the sea in G City in F Prefecture but there are similar candidates near here." on the display unit 15 or outputs audio guidance from a speaker. The user performs a touch operation on the subject that the user wants to set as a destination, so that the chosen subject is set as the destination.

Using FIG. 9, information processing performed by the navigation system 1 will be described. For the process of steps S301 to S305 and step S312 in the flowchart represented in FIG. 9, the same process as that of steps S101 to S105 and step S108 in the flowchart represented in FIG. 3 is performed. For the process of steps S310 and step S311, the same process as that of step S209 and step S210 in the flowchart represented in FIG. 7 is performed.

After acquiring position information on the subject at step S304, the navigation control device 20 determines whether the distance from the current position to the subject is equal to or more than the given distance (step S306). When the distance to the subject that is specified by the subject specifying unit 26 is equal to or more than the given distance (YES at step S306), the navigation control device 20 goes to step S307. When the distance to the subject that is specified by the subject specifying unit 26 is not equal to or more than the given distance (NO at step S306), the navigation control device 20 goes to step S310.

Using the subject specifying unit 26, the navigation control device 20 specifies similar second subjects that are positioned within the area of the given distance from the current position (step S307). The navigation control device 20 goes to step S308. A single second subject or multiple second subjects may be specified at step S307.

Using the subject position information acquisition unit 27, the navigation control device 20 acquires pieces of position information respectively corresponding to the second subjects that are positioned within the area of the given distance from the current position (step S308). The navigation control device 20 goes to step S309.

The navigation control device 20 displays the subject that is specified by the subject specifying unit 26 and displays the second subjects as alternative candidate sites that are positioned within the area of the given distance from the current position (step S309). More specifically, using the route guidance unit 28, the navigation control device 20 displays an image obtained by superimposing the subject, which is specified by the subject specifying unit 26, and the alternative candidates positioned within the area of the given distance from the current position on a map. The navigation control device 20 goes to step S310.

In this manner, when the distance from the current position to the recognized subject is equal to ore more than the given distance, the navigation system 1 specifies a similar second subject.

As described above, in the fourth embodiment, when the distance from the current position to the recognized subject is equal to or more than the given distance, specifying the similar second subjects within the given distance from the current position easily enables route guidance. As described above, according to the fourth embodiment, when a site corresponding to an image that spurs the user to want to go to the site is far, it is possible to represent a similar alternative candidate that is positioned near the current position.

Fifth Embodiment

Figure 10:
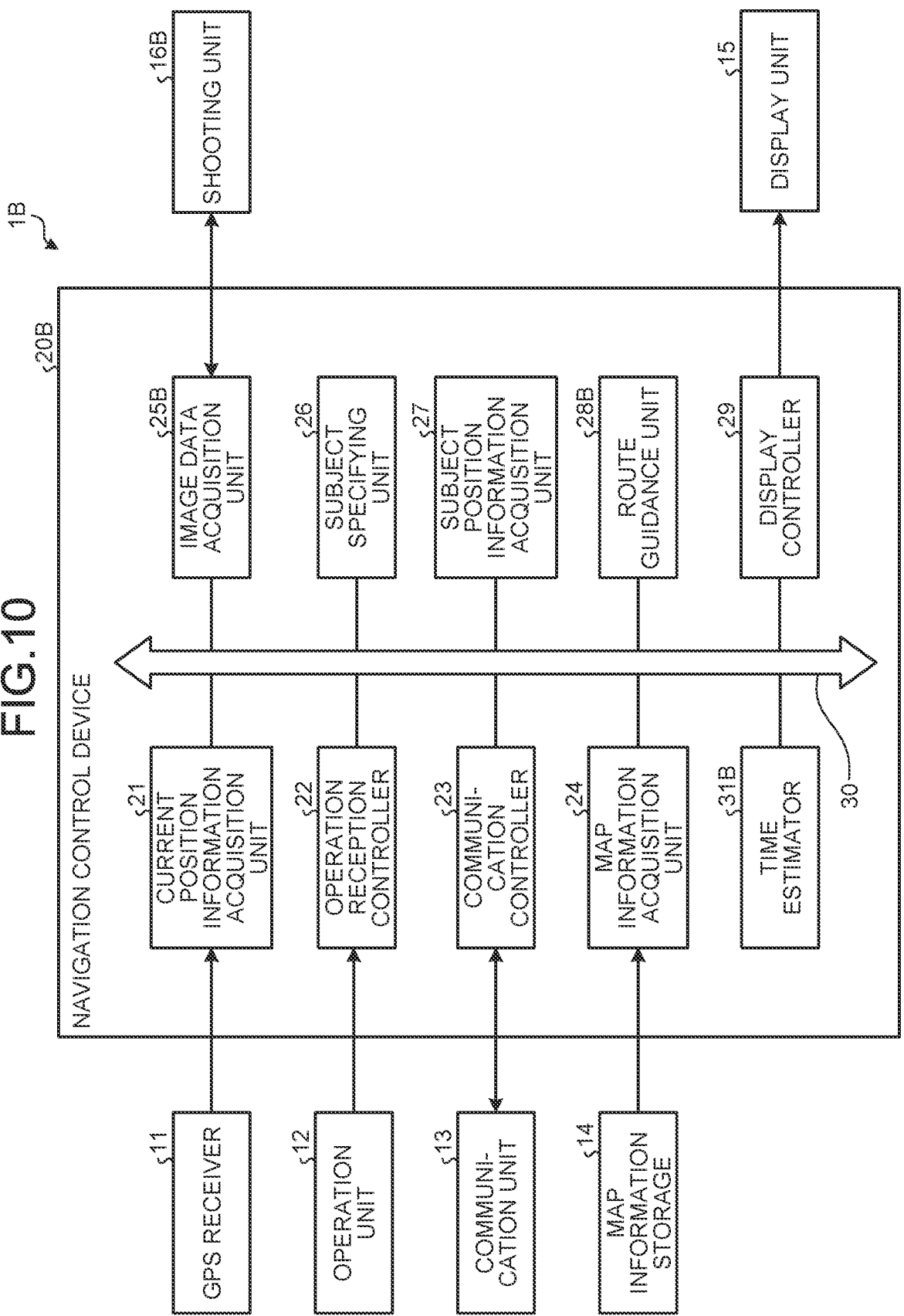
FIG. 10 is a block diagram illustrating an outline of a navigation control device according to a fifth embodiment.
Figure 11:
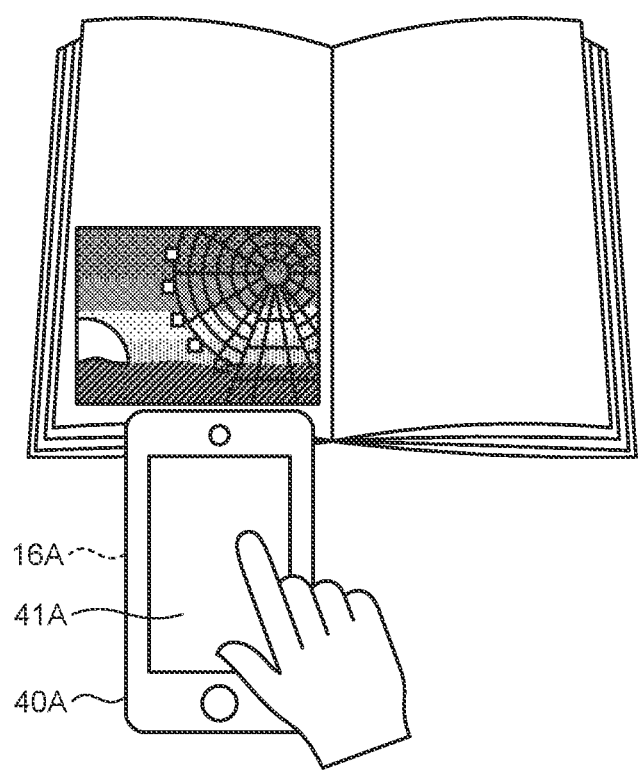
FIG. 11 is a diagram illustrating that a user is shooting a photo on a magazine using a shooting unit.

With reference to FIGS. 10 to 12, a navigation system 1B according to a fifth embodiment will be described. FIG. 10 is a block diagram illustrating an outline of a navigation control device according to the fifth embodiment. FIG. 11 is a diagram illustrating that a user is shooting a photo on a magazine using a shooting unit. FIG. 12 is a flowchart illustrating a flow of a process performed by the navigation control device according to the fifth embodiment. The navigation system 1B according to the fifth embodiment is different from the navigation system 1 of the first embodiment in that a navigation control device 20B includes a time estimator 31B and in the process performed by a route guidance unit 28B.

The time estimator 31B estimates a time of shooting of the image data. More specifically, the time estimator 31B performs image processing on image data and performs pattern matching with a recognition dictionary, thereby specifying a time of shooting. For example, when the sun is recognized, the time estimator 31B may estimate that the time of shooting is during daytime. For example, when the moon or stars are recognized, the time estimator 31B may estimate that the time of shooting is during night time. For example, when sunrise is recognized, the time estimator 31B may estimate that time of shooting is around the time of sunrise. For example, when sunset is recognized, the time estimator 31B may estimate that the time of shooting is around the time of sunset.

The time estimator 31B may perform image processing on the image data and, according to the hue, color, and luminance of the image data, estimate a time of shooting. For example, when the area occupied by blue is large in the image data, the time estimator 31B may estimate that the blue sky is shot and the time of shooting is during daytime. For example, when the area occupied by black is large in the image data, the time estimator 31B may estimate that the night sky is shot and the time of shooting is during nighttime. For example, when the area occupied by yellow, orange or white is large in the image data, the time estimator 31B may estimate that sunrise is shot and the time of shooting is around the time of sunrise. For example, when the area occupied by bright or dark red or orange is large, the time estimator 31B may estimate that sunset is shot and the time of shooting is around the time of sunset.

Using FIG. 11, a process of estimating the time of shooting performed by the time estimator 31B will be described more in detail. The time estimator 31B recognizes sunset from the image data illustrated in FIG. 11 and, because the area occupied by dark red and orange is large, estimates that the time of shooting is before sunset.

The route guidance unit 28B sets, as a destination, position information corresponding to the subject serving as a subject of route guidance and provides route guidance to arrive the destination at the time that is estimated by the time estimator 31B. For example, when multiple routes can be shown, the route guidance unit 28B provides route guidance along a route enabling arrival at the estimated time. For example, the route guidance unit 28B sets a waypoint and performs a roundabout route guidance to arrive the destination at the estimated time.

The route guidance unit 28B may provide route guidance in which a guidance start time is set to arrive the destination at the time that is estimated by the time estimator 31B. For example, when the time required to get to the destination is two hours and the estimated time is five hours later, the guidance start time may be set at a time after three hours and route guidance may be provided. The route guidance unit 28B may set any one of the subject or any one of the second subjects that is chosen by the user, which are described in the first to fourth embodiments, as a subject of route guidance.

Using FIG. 12, information processing performed by the navigation system 1B will be described. For the process of steps S401 to S405, step S407 and step S409 in the flowchart represented in FIG. 12, the same process as that of steps S101 to S105, step S106 and step S108 in the flowchart represented in FIG. 3 is performed.

After acquiring position information on a subject at step S405, using the time estimator 31B, the navigation control device 20B estimates the time of shooting of image data (step S406). The navigation control device 20B then goes to step S407.

The navigation control device 20B searches for a route (step S408). More specifically, using the route guidance unit 28B, the navigation control device 20B sets, as a destination, position information corresponding to the subject serving as a subject of route guidance and provides route guidance to arrive the destination at the time that is estimated by the time estimator 31B. The navigation control device 20 goes to step S409.

At step S403, the subject specifying unit 26 specifies a subject in the image data illustrated in FIG. 11 as "H Park" with a Ferris wheel.

At step S406, the time estimator 31B estimates that the time of shooting of the image data illustrated in FIG. 11 is before sunset.

At step S407, the route guidance unit 28B displays, for example, a message image saying "This photo is highly likely to be of H Park. Will you set the photo as the destination?" on the display unit 15 or outputs audio guidance from the speaker. When the user performs a touch operation to choose the "YES" button image (YES at step S407), at step s408, the route guidance unit 28B searches for a route. The route guidance unit 28B makes, on the display unit 15, popup displays of a message image saying "The time of shooting is likely to be in early evening. The time of sunset is 18:32 today and it is recommended to depart around 16:00." and button images to choose "Depart now" or "Depart later" or outputs audio guidance from a speaker. When the user performs a touch operation on the "Depart now" button image, the route guidance unit 28B goes to step S409 and starts route guidance from the current position. When the user performs the touch operation on the "Depart later" button image, the route guidance unit 28B starts the route guidance at step S409 from a given time.

At step S407, for example, the route guidance unit 28B displays, for example, a message image saying "This photo is highly likely to be of H Park. Will you set the photo as the destination?" or outputs audio guidance from the speaker. When the user performs a touch operation of choosing the "YES" button image (YES at step S407), at step s408, the route guidance unit 28B searches for a route. The route guidance unit 28B then makes popup displays of a message image saying "The time of shooting is likely to be in early evening. The time of sunset is 18:32 today and a route to arrive around 18:00 can be set" and button images to choose "Depart now", "Adjust the time of arrival and depart now", or "Depart later" on the display unit 15 or outputs audio guidance from the speaker. When the user performs a touch operation on the "Adjust the time of arrival and depart now" button image, the route guidance unit 28B goes to step S409 and starts route guidance of a roundabout route from the current position to the subject for which the time of arrival is adjusted.

As described above, the navigation system 1 estimates a time at which an image is shot and provides route guidance to arrive the destination at the estimated time. Alternatively, route guidance in which a guidance start time is set to arrive the destination at the estimated time may be provided. Furthermore, route guidance in which a waypoint is set to arrive the destination at the estimated time may be provided.

As described above, in the fifth embodiment, it is possible to estimate a time at which an image is shot and provide route guidance to arrive the destination at the estimated time. Alternatively, in the fifth embodiment, it is possible to provide route guidance in which a guidance start time is set to arrive the destination at an estimated time. Furthermore, in the fifth embodiment, it is possible to provide route guidance in which a waypoint is set to arrive the destination at an estimated time. As described above, according to the fifth embodiment, the user is able to see a situation close to a situation that is introduced by an image that spurs the user to want to go the site of the image.

Each component of the navigation system 1 illustrated in the drawings is functionally schematic and is not necessarily required to be physically configured as illustrated in the drawings. In other words, a specific mode of each device is not limited to those illustrated in the drawings, and all or part of the components may be functionally or physically distributed or integrated in a given unit according to the load of processing or the state of use of each device.

The configuration of the navigation system 1 is implemented by a program that is loaded in a memory as software, or the like. In the above-described embodiments, the configuration is described as functional blocks that are implemented by association of these sets of hardware or hardware. In other words, these functional blocks can be implemented in various forms using only hardware, software, or a combination thereof.

The components described above include those easily achieved by those skilled in the art or those substantially the same. Furthermore, the above-described configurations can be combined as appropriate. Alternatively, various omissions, replacements and changes of the configurations can be made within the scope of the disclosure.

In the description above, the shooting unit 16A is described as one that shoots an image on a printed matter, however, the shooting unit 16A is not limited thereto. The shooting unit 16A may shoot, for example, a place of scenic beauty, a place of interest, a structure, a streetscape, natural scenery, the inside of a structure, such as the distinctive interior of a shop, a distinctive product, distinctive food or drink, a distinctive living thing, or a distinctive plant. For example, when the user shoots a distinctive cake that is placed in front of the user and sets the shot as the destination, route guidance to a shop selling the cake is provided. For example, when a user shoots a distinctive streetscape in front of the user and sets the shot as the destination, route guidance to a subject that is near and that is similar to the streetscape is provided. In this manner, route guidance is easily enabled also from an image obtained by shooting a subject in front of the user.

The embodiments achieves an effect that it is possible to provide a navigation control device, a navigation method and a program that easily enable route guidance from an image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A navigation control device comprising:
   at least one processor that executes computer-executable units comprising:
      an image data acquisition unit configured to acquire image data;
      a subject specifying unit configured to recognize a first subject in the image data that is acquired by the image data acquisition unit and specify the first subject;
      a subject position information acquisition unit configured to acquire position information corresponding to the first subject that is specified by the subject specifying unit; and
      a route guidance unit configured to set, as a destination, the position information corresponding to the first subject that is specified by the subject specifying unit and provide route guidance, wherein
   the subject specifying unit is configured to, when being unable to uniquely specify the recognized subject, specify a second subject similar to the first subject in addition to the first subject,
   the subject position information acquisition unit is configured to acquire position information corresponding to the second subject, and
   the route guidance unit is configured to, when the second subject is set as a destination, set the position information corresponding to the second subject as the destination and provide route guidance.

2. The navigation control device according to claim 1, wherein
   the subject specifying unit is configured to specify a plurality of the second subjects similar to the first subject,
   the subject position information acquisition unit is configured to acquire a plurality of pieces of position information respectively corresponding to the second subjects that are specified by the subject specifying unit, and
   the route guidance unit is configured to set, as a destination, the position information that corresponds to the second subject that is chosen from among the second subjects that are specified by the subject specifying unit and provide route guidance.

3. The navigation control device according to claim 2, wherein the route guidance unit is configured to choose the second subject that is a closest to the current position from among the second subjects that are specified by the subject specifying unit, set, as a destination, the position information corresponding to the chosen second subject, and provide route guidance.

4. The navigation control device according to claim 1, further comprising a time estimator configured to estimate a time of shooting of the image data,
   wherein the route guidance unit is configured to set, as a destination, position information corresponding to either the first subject or the second subject serving as a subject of route guidance and provide route guidance to arrive the destination at the time that is estimated by the time estimator.

5. The navigation control device according to claim 4, wherein the route guidance unit is configured to provide the route guidance in which a guidance start time is set to arrive the destination at the time that is estimated by the time estimator.

6. The navigation control device according to claim 4, wherein the route guidance unit is configured to provide the route guidance in which a waypoint is set to arrive the destination at the time that is estimated by the time estimator.

7. A navigation method comprising:
   acquiring image data;
   recognizing a first subject in the image data that is acquired at the acquiring and specifying the first subject;
   acquiring position information corresponding to the first subject that is specified at the specifying;
   setting, as a destination, the position information corresponding to the first subject that is specified at the specifying and providing route guidance,
   the recognizing includes specifying a second subject similar to the first subject when the recognized first subject is unable to be uniquely specified;
   selecting the second subject and acquiring position information corresponding to the second subject; and
   setting the position information corresponding to the second subject as the destination and providing route guidance when the second subject is set as a destination.

8. A non-transitory computer-readable recording medium containing a computer program causing a computer that operates as a navigation control device to execute:
   acquiring image data;
   recognizing a first subject in the image data that is acquired at the acquiring and specifying the first subject;
   acquiring position information corresponding to the first subject that is specified at the specifying; and
   setting, as a destination, the position information corresponding to the first subject that is specified at the specifying and provide route guidance, wherein
   the recognizing includes specifying a second subject similar to the first subject in addition to the first subject when the recognized first subject is unable to be uniquely specified, the acquiring of position information includes acquiring position information corresponding to the second subject, and the setting includes setting the position information corresponding to the second subject as the destination and providing route guidance when the second subject is set as a destination.

* * * * *